(12) United States Patent  
Mason

(10) Patent No.: US 9,839,864 B2  
(45) Date of Patent: Dec. 12, 2017

(54) ENCLOSED MEDIA FLUID FILTRATION DEVICE

(71) Applicant: Jeff Mason, Vancouver, WA (US)

(72) Inventor: Jeff Mason, Vancouver, WA (US)

(*) Notice: Subject to any disclaimer, the term of this patent is extended or adjusted under 35 U.S.C. 154(b) by 232 days.

(21) Appl. No.: 14/924,669

(22) Filed: Oct. 27, 2015

(65) Prior Publication Data

US 2017/0113164 A1    Apr. 27, 2017

(51) Int. Cl.
*B01D 24/10* (2006.01)
*C02F 1/00* (2006.01)
*B01D 24/46* (2006.01)
*C02F 103/00* (2006.01)
*B01D 24/40* (2006.01)
*B01D 24/08* (2006.01)
*B01D 24/42* (2006.01)

(52) U.S. Cl.
CPC ......... *B01D 24/10* (2013.01); *B01D 24/4631* (2013.01); *C02F 1/004* (2013.01); *B01D 24/08* (2013.01); *B01D 24/40* (2013.01); *B01D 24/42* (2013.01); *B01D 2201/08* (2013.01); *C02F 2103/001* (2013.01)

(58) Field of Classification Search
CPC .... B01D 23/10; B01D 23/1223; B01D 23/24; B01D 24/08; B01D 24/10; B01D 24/40; B01D 24/42; B01D 24/4631; B01D 2201/08; C02F 1/004; C02F 1/28; C02F 1/281; C02F 1/286; C02F 2103/001
See application file for complete search history.

(56) References Cited

U.S. PATENT DOCUMENTS

| | | |
|---|---|---|
| 1,083,995 A | 1/1914 | Davis et al. |
| 1,405,071 A | 1/1922 | Stickney et al. |
| 3,298,523 A | 1/1967 | Johnson et al. |
| 3,534,855 A | 10/1970 | Guillerd et al. |
| 3,623,978 A | 11/1971 | Boze et al. |
| 3,724,665 A | 4/1973 | Hall et al. |
| 3,820,658 A | 6/1974 | Cruze et al. |
| 3,948,773 A | 4/1976 | Tucker |
| 3,994,810 A | 11/1976 | Schaeffer |
| 4,036,757 A | 7/1977 | Peasley |
| 4,297,209 A | 10/1981 | DeVisser et al. |
| 4,405,466 A | 9/1983 | Giannelli et al. |
| 4,477,343 A | 10/1984 | Tucker |
| 4,537,687 A | 8/1985 | Piper |

(Continued)

*Primary Examiner* — Matthew O Savage
(74) *Attorney, Agent, or Firm* — Rylander & Associates, PC; Philip R.M. Hunt

(57) ABSTRACT

A filtration device comprising a media basket, a baseplate, and a canister. The media basket is affixed to the baseplate. The canister has a cavity therein and is detachably coupled with the baseplate to enclose the media basket. The media basket contains a porous filtration material that efficiently removes contaminants from liquid. The device is configured to establish a first siphon to convey liquid from outside the device into the canister cavity through a canister pipe when a liquid level outside the filtration device is higher than the top of the weir in the canister pipe and configured to establish a second siphon to convey liquid from canister cavity through the top of a center riser pipe and out an outlet pipe when the first siphon has been established and the liquid level outside the filtration device is higher than the top of the center riser pipe.

14 Claims, 11 Drawing Sheets

(56) References Cited

U.S. PATENT DOCUMENTS

| | | | |
|---|---|---|---|
| 4,561,979 | A | 12/1985 | Harms et al. |
| 4,592,848 | A | 6/1986 | Pabst |
| 4,642,188 | A | 2/1987 | DeVisser et al. |
| 4,643,836 | A | 2/1987 | Schmid |
| 4,678,564 | A | 7/1987 | Moorehead et al. |
| 4,818,420 | A | 4/1989 | Mims |
| 5,000,860 | A | 3/1991 | Drewry |
| 5,017,241 | A | 5/1991 | Ryan |
| 5,114,596 | A | 5/1992 | Laterra |
| 5,151,175 | A | 9/1992 | Royal |
| 5,214,020 | A | 5/1993 | Shimoda |
| 5,288,399 | A | 2/1994 | Schulz |
| 5,322,629 | A | 6/1994 | Stewart |
| 5,464,543 | A | 11/1995 | Moore |
| 5,484,536 | A | 1/1996 | Yamaguchi et al. |
| 5,624,576 | A | 4/1997 | Lenhart et al. |
| 5,707,527 | A | 1/1998 | Knutson et al. |
| 5,720,875 | A | 2/1998 | Stegall, Sr. et al. |
| 5,746,911 | A | 5/1998 | Pank |
| 5,759,412 | A | 6/1998 | McDougald |
| 5,792,373 | A | 8/1998 | Bennick et al. |
| 6,027,639 | A | 2/2000 | Lenhart, Jr. et al. |
| 6,110,389 | A | 8/2000 | Horowitz |
| 6,126,816 | A | 10/2000 | Ruiz, Jr. |
| 6,132,626 | A | 10/2000 | Hart |
| 6,171,507 | B1 | 1/2001 | Roy et al. |
| 6,197,192 | B1 | 3/2001 | Smith-Haddon et al. |
| 6,264,835 | B1 | 7/2001 | Pank |
| 6,294,098 | B1 | 9/2001 | Bergmann |
| 6,368,513 | B1 | 4/2002 | Christophe et al. |
| 6,428,690 | B1 | 8/2002 | Tse |
| 6,576,146 | B2 | 6/2003 | Fry et al. |
| 6,596,158 | B1 | 7/2003 | Cowan |
| 6,649,048 | B2 | 11/2003 | de Ridder et al. |
| 6,869,528 | B2 | 3/2005 | Pank |
| 6,921,481 | B2 | 7/2005 | Jessop et al. |
| 7,000,782 | B2 | 2/2006 | Walton et al. |
| 7,032,760 | B2 | 4/2006 | Walton et al. |
| 7,182,856 | B2 | 2/2007 | Pank |
| 7,214,311 | B2 | 5/2007 | Aberle et al. |
| 7,708,149 | B2 | 5/2010 | Pank et al. |
| 8,110,099 | B2 | 2/2012 | Hersey et al. |
| 8,512,555 | B1 * | 8/2013 | Allen, II ............... B01D 24/08 210/170.03 |
| 2002/0117435 | A1 | 8/2002 | Pank |
| 2003/0034286 | A1 | 2/2003 | Butler |
| 2003/0094407 | A1 * | 5/2003 | de Ridder ............... B01D 24/08 210/120 |
| 2003/0127377 | A1 | 7/2003 | Pank |
| 2003/0196950 | A1 | 10/2003 | Kraft |
| 2005/0178719 | A1 | 8/2005 | Pank |
| 2007/0023352 | A1 | 2/2007 | Pank et al. |
| 2008/0217227 | A1 | 9/2008 | Pank |
| 2008/0217238 | A1 | 9/2008 | Pank |
| 2008/0217257 | A1 | 9/2008 | Pank |

\* cited by examiner

ENCLOSED MEDIA FLUID FILTRATION DEVICE

FIELD OF THE INVENTION

The present invention relates to filtration of contaminants from a liquid. More particularly, the present invention relates to the filtration of contaminants in stormwater through a vertical passive siphon operated filter.

BACKGROUND

Removal of contaminants by filtration is commonly used and accepted practice in stormwater applications as a method for capturing fine particles. Filters employ a various array of media that capture particulate matter by bonding or capture. The media is typically granular and is contained in a device or structure that allows media compaction. This increases the media density and increases the ability of the media to remove fine particulate matter. Filters for stormwater are usually passive devices and typically fall into two categories: Horizontal filters and vertical filters.

Horizontal filters can be used in an up-flow or down-flow configuration. In a down-flow application the flow rate is driven by gravity and in an up-flow configuration the flow rate is generated through hydraulic head. In both cases, an increase in the available water column increases the flow rate. Horizontal filters tend to be larger in size than vertical filters as they achieve their surface area via a horizontal bed. Common types of horizontal filters include but are not limited to Sand Beds, Rain Gardens, and Swales. Horizontal filters can lose filtration capacity due to the plugging of the initial layer of media. Often times the media below the initial layer has sufficient capacity but the occlusion of the initial layer reduces the media lifespan. To regain filtration capacity it requires replacement or alteration of the initial or entire media bed.

Vertical filters are often times modular, which facilitates deploying them in series or parallel to achieve the desired flow rate. Vertical filters are typically located inside a containment structure that often times acts as a pre-settling device for larger particles. The vertical nature of these devices allows them to be compact and often times they are located underground. Filtration media for vertical filters is typically contained within a screened device where the vertical screen acts as the surface area for the filtration. Flow rates through the filter media are achieved via a difference in hydraulic head between the liquid in the containment vault and the filter outlet. The liquid can be directly conveyed by the pressure difference, or the hydraulic head is used to activate a siphon mechanism. Filters with siphon mechanisms typically achieve higher mean flow rates and obtain greater liquid dispersion within the media.

Vertical filters can still be subject to the plugging challenges of horizontal filters. Often times the floor of the containment structure accumulates large amounts of settled sediment. The sediment depth accrues and comes in direct contact with the filter media. When the filter is under operation during a storm event the sediment can become re-suspended in the liquid and increase the sediment loading on the filter beyond its intended design. This causes premature media failure and more frequent maintenance. Another challenge for siphon operated vertical filters is stagnant stormwater between operation cycles. A passive siphon requires a fixed hydraulic water column within the containment structure to cause siphon actuation. Variations in storm frequency and intensities can cause long periods in between operation cycles where the containment vault is partially full of stormwater but not full enough to cause siphon activation. The partial submergence of the filter media for long periods can potentially cause adverse effects and result in anaerobic conditions, organics growth, and potentially cause premature occlusion.

BRIEF DESCRIPTION OF THE DRAWINGS

The present invention will be described by way of exemplary embodiments, but not limitations, illustrated in the accompanying drawings in which like references denote similar elements, and in which.

The accompanying drawings, which are incorporated into and constitute a part of this specification, illustrate one or more embodiments of the invention and, together with the detailed description, serve to explain the principles and implementations of the invention.

DETAILED DESCRIPTION

Before beginning a detailed description of the subject invention, mention of the following is in order. When appropriate, like reference materials and characters are used to designate identical, corresponding, or similar components in different figures. The figures associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Use of directional terms such as "upper," "lower," "above," "below", "in front of," "behind," etc. are intended to describe the positions and/or orientations of various components of the invention relative to one another as shown in the various Figures and are not intended to impose limitations on any position and/or orientation of any embodiment of the invention relative to any reference point external to the reference.

Those skilled in the art will recognize that numerous modifications and changes may be made to the exemplary embodiment(s) without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the exemplary embodiment(s) is essential. Other embodiments are possible, their specific designs depending upon the particular application. As such, the scope of the invention should not be limited by the particular embodiments herein described but should be defined only by the appended claims and equivalents thereof.

Exemplary Embodiment—Device Construction Description

Figure 1:
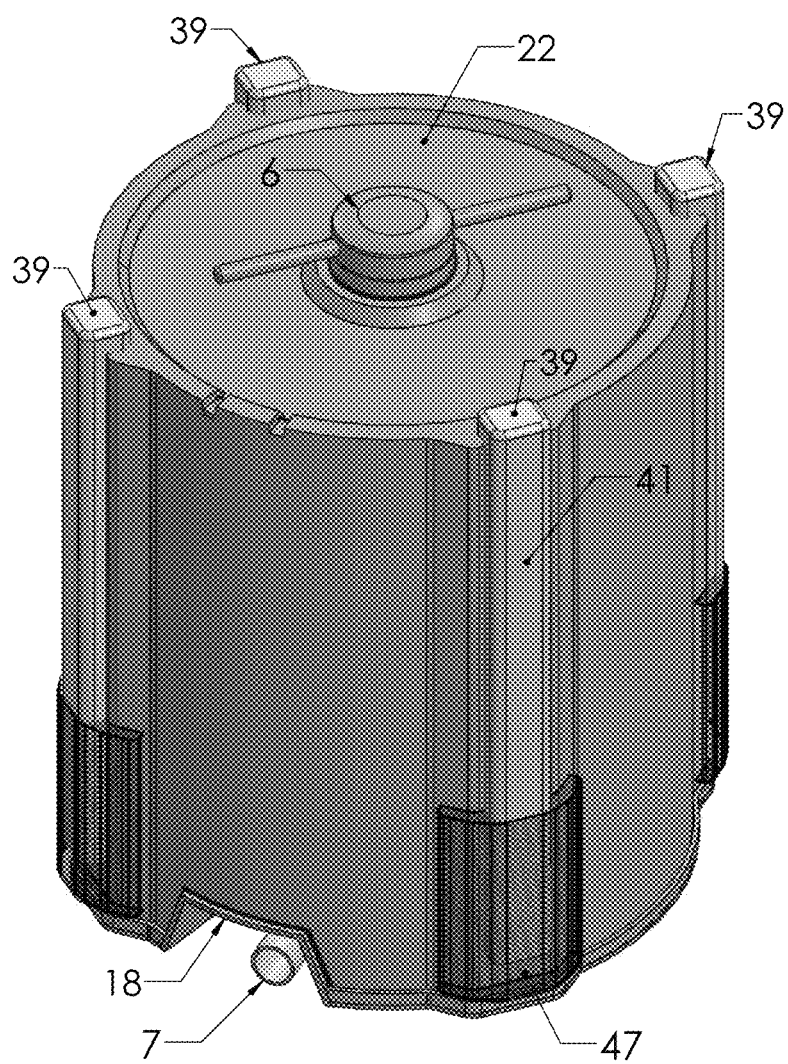
FIG. 1 shows an exterior isometric view of an exemplary filtration device.
Figure 2:
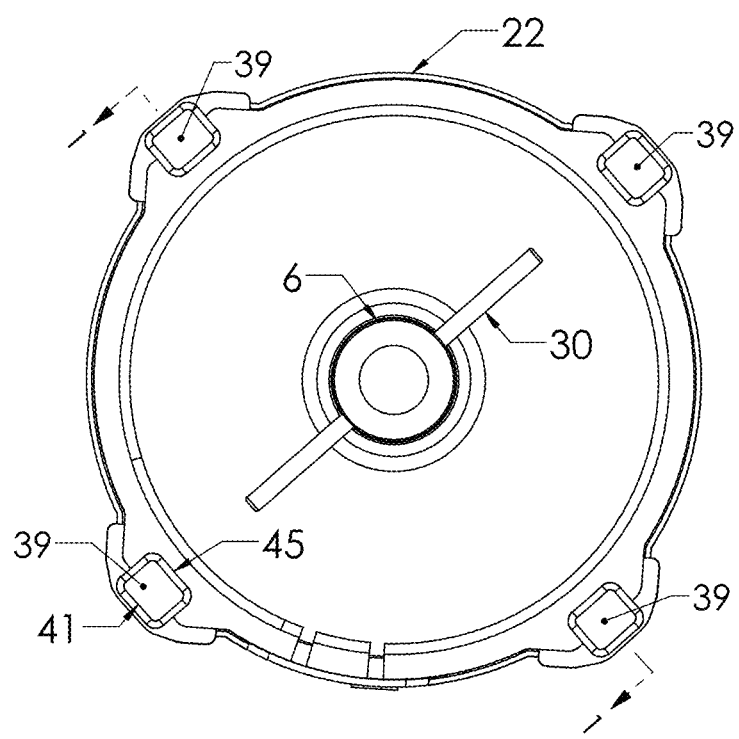
FIG. 2 shows an overhead plan view of the exemplary filtration device.
Figure 3:
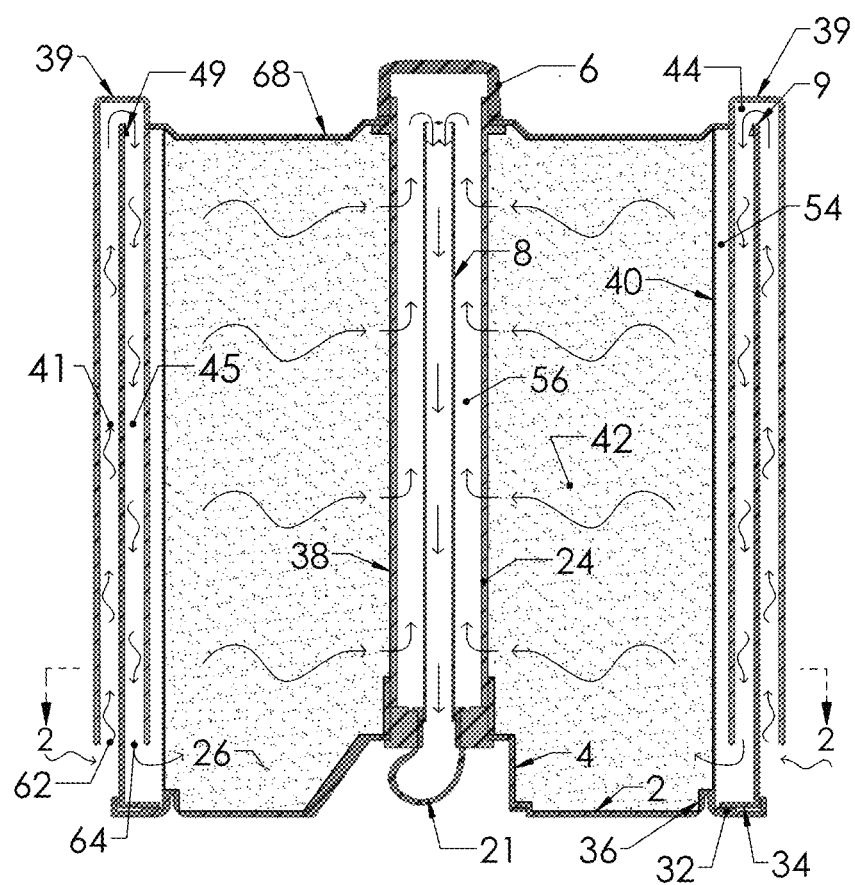
FIG. 3 shows an assembled side profile view of the exemplary filtration device taken along line 1-1 of FIG. 2 with arrows to depict liquid direction during operation.
Figure 4:
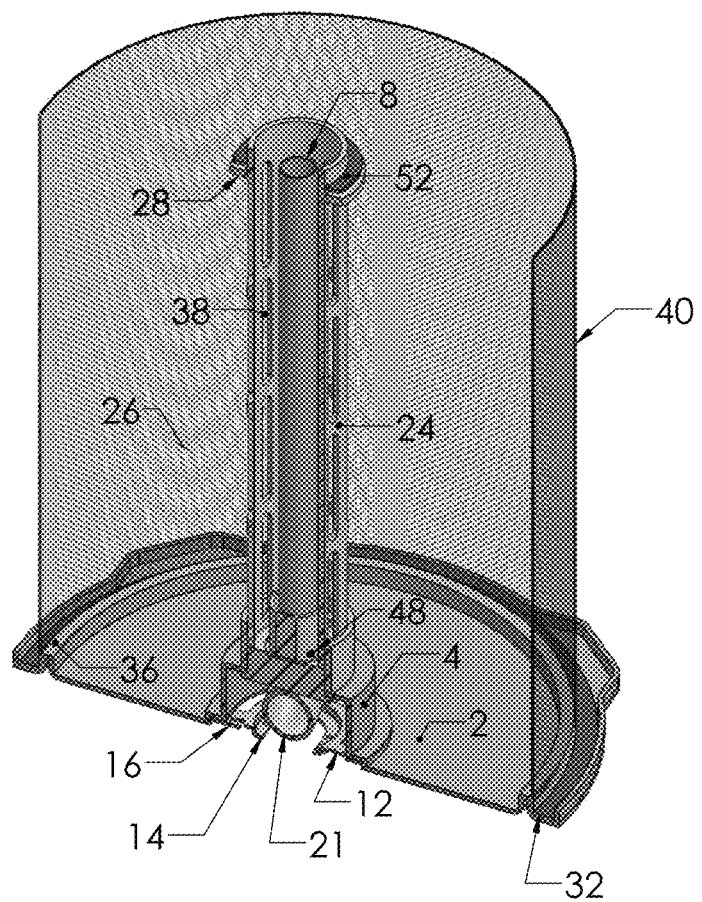
FIG. 4 shows an isometric section view of the interior of the exemplary filtration device without the canister.
Figure 5:
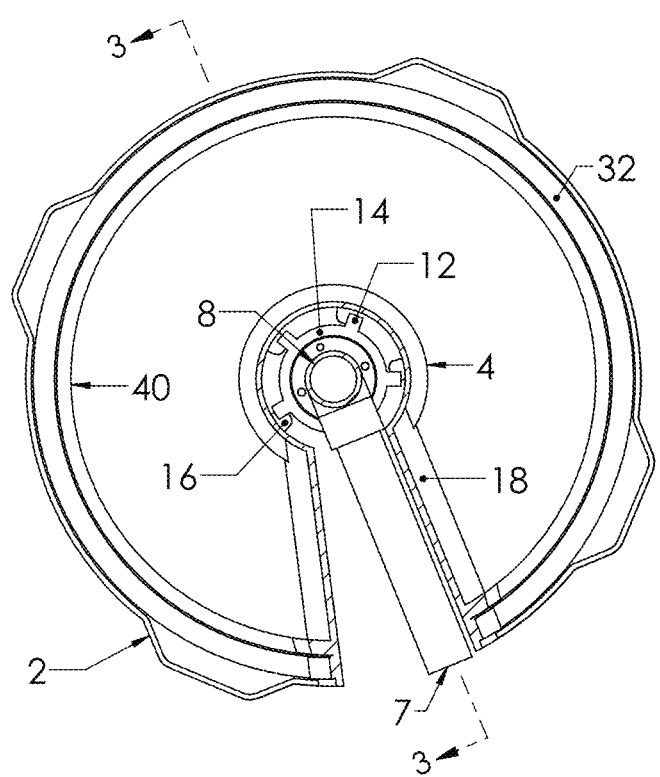
FIG. 5 shows an overhead plan view taken along line 2-2 of FIG. 3.
Figure 6:
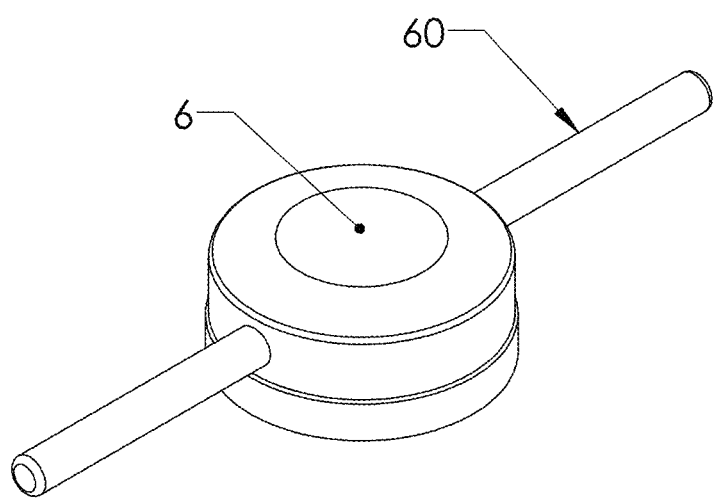
FIG. 6 shows an isometric view of the cap of the exemplary filtration device.
Figure 7:
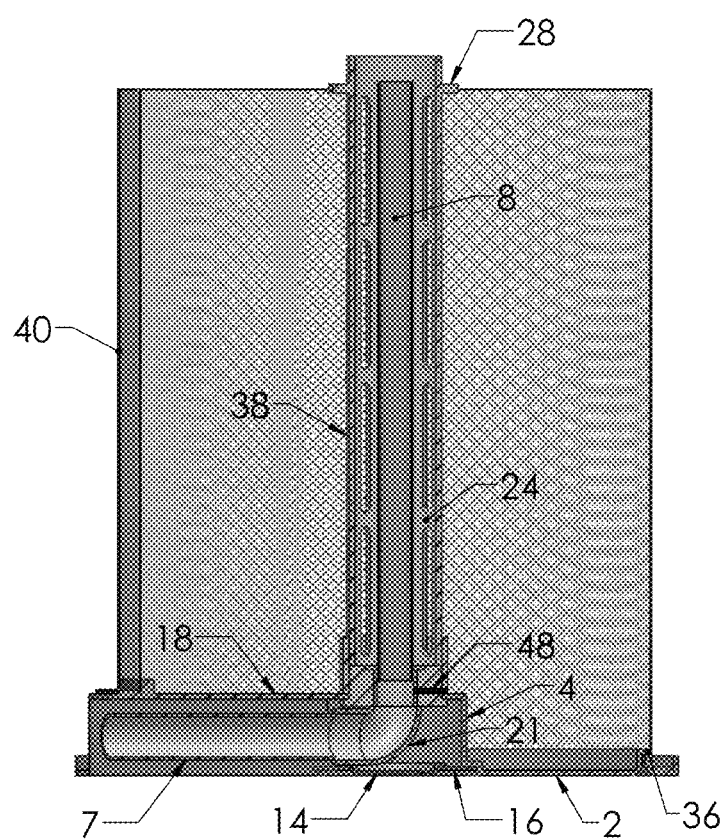
FIG. 7 shows a profile view taken along line 3-3 of FIG. 5.
Figure 8:
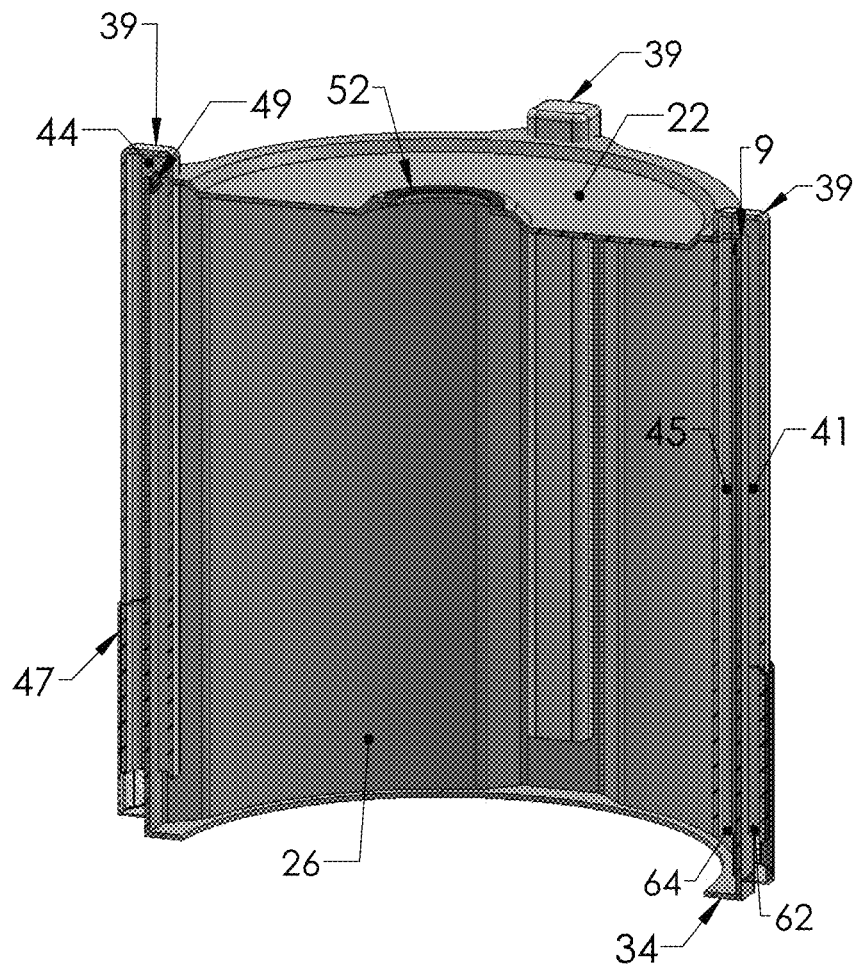
FIG. 8 shows a profile view of the canister with cut section to depict interior and exterior canister pipes.
Figure 9:
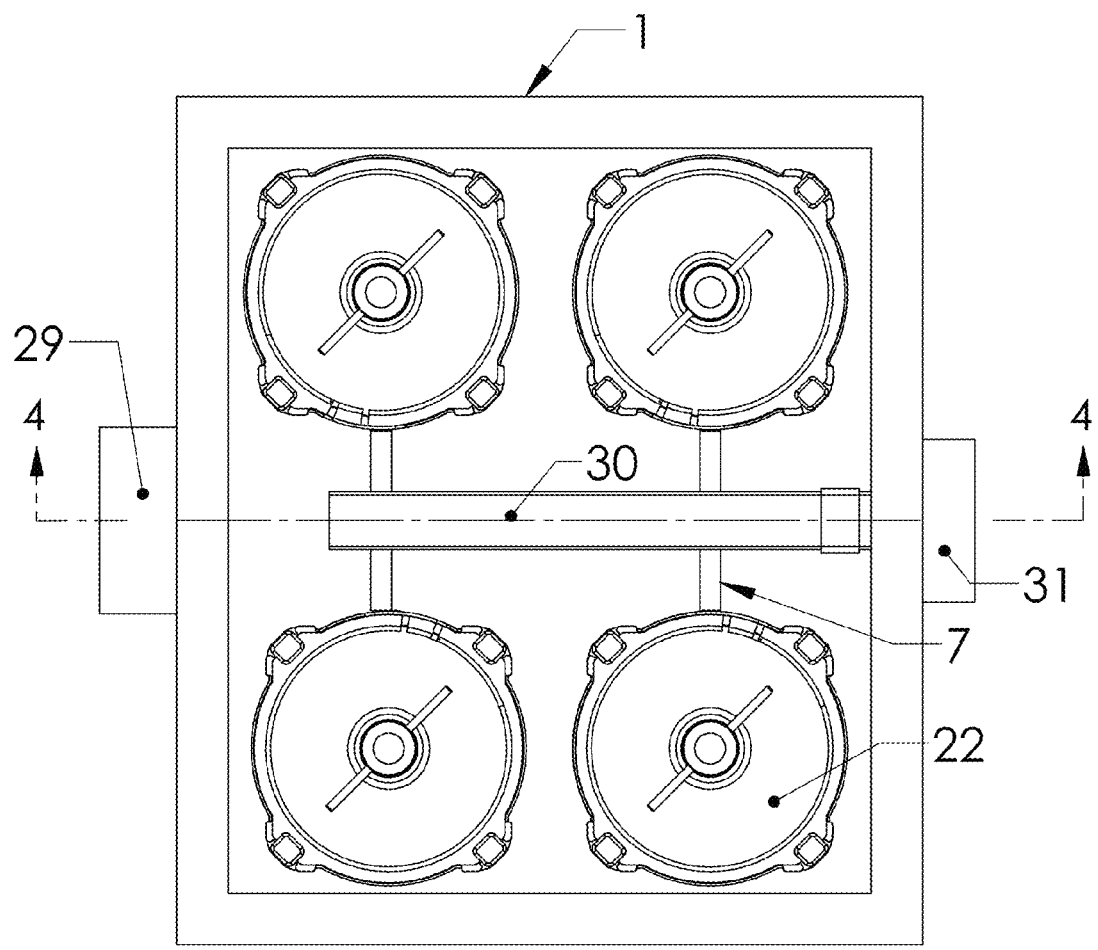
FIG. 9 shows an overhead plan view of four exemplary filtration devices in parallel installed in a containment structure.
Figure 10:
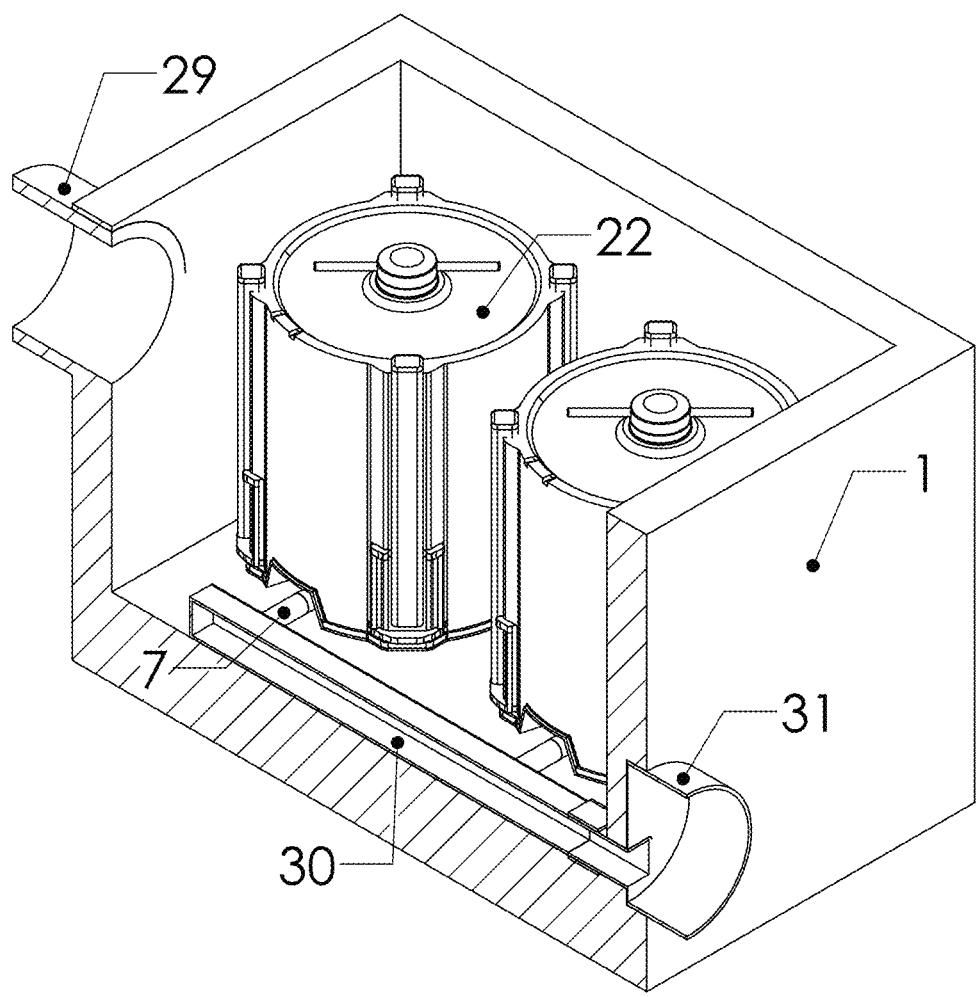
FIG. 10 shows an isometric cross section view taken along line 4-4 of FIG. 9.

FIGS. 1-3 show an exemplary embodiment of a filtration device 70. The exemplary filtration device 70 comprises a media basket 40, a baseplate 2, and a canister 22. The media basket 40 is affixed to the baseplate 2. The canister 22 has an open bottom as well as a top opening 66 located in a ceiling 68 of the canister 22. The canister 22 has a cavity 26 therein and is detachably coupled with the baseplate 2 to enclose the media basket 40. The media basket 40 contains a porous filtration media 42 that efficiently removes contaminants from the liquid. In the exemplary embodiment, the media basket 40, the baseplate 2 and the canister 22 are cylindrical in shape or at least have a circular cross-section, but in other embodiments may have a rectangular or other suitable shape.

The baseplate 2 is a horizontal plate that is typically impermeable, flat, and round. The baseplate 2 is typically made of plastic and typically molded, but in other embodiments may be made of other suitable materials and made by other manufacturing methods. The baseplate 2 contains two raised sections. The first raised section is the column spigot 4. The column spigot 4 is a raised column configured for the attachment of a support column 24 as well as a connection point between a center riser pipe 8 and an outlet pipe 7. In the exemplary embodiment, the column spigot 4 is cylindrical, but in other embodiments, may have a rectangular or other shape. The support column 24 attaches to the column spigot 4 via either a glued or mechanical connection. Additionally, on an interior bottom of the column spigot 4, one or more rigid buoyancy tabs 12 are either molded into the baseplate or permanently affixed. The purpose of the buoyancy tabs 12 is to serve as points to affix the exemplary filtration device 70 to the floor of the containment structure 1 to prevent flotation when there are unbalanced buoyant forces acting on the exemplary filtration device 70. The buoyancy tabs 12 interlock underneath a buoyancy plate 14 that is permanently affixed to the containment structure 1 floor. In the exemplary embodiment, the buoyancy plate 14 is a cylindrical plate that is most likely made of plastic or metal and is rigid to withstand the buoyant forces of the exemplary filtration device 70. In other embodiments the buoyancy plate 14 may have a square shape or shape other than cylindrical. The buoyancy plate 14 has one or several thin locking protrusions 16 that allow the buoyancy tabs 12 to slide underneath when the exemplary filtration device 70 is horizontally rotated. When the exemplary filtration device 70 experiences buoyant forces the buoyancy tabs 12 will transfer the forces into the locking protrusions 16 of the buoyancy plate 14 which is permanently affixed to the floor of the containment structure 1 thus preventing any movement.

The second raised section of the baseplate 2 is an outlet pipe cover 18. The outlet pipe cover 18 is a raised protrusion that runs radially from the column spigot 4 to the outer edge of the baseplate 2. The outlet pipe cover 18 is configured to accommodate an outlet pipe 7 located below the baseplate 2 on the floor of the containment structure. The outlet pipe 7 is a horizontal pipe that is located directly below the outlet pipe cover 18 and is most likely affixed to the floor of the containment structure 1. The outlet pipe 7 has a vertical bend 21 at or near to the center of the column spigot 4. The vertical bend 21 of the outlet pipe 7 is configured to facilitate a watertight slip connection to the center riser pipe 8. This slip connection allows for removal of the exemplary filtration device 70 when maintenance is required.

The support column 24 is a vertical, rigid, permeable pipe that serves multiple functions in the exemplary filtration device 70. A first function of the support column 24 is to act as an attachment point between the baseplate 2 and the canister 22. The bottom of the support column 24 is permanently affixed to the column spigot 4 while the top is configured for coupling with a cap 6 by threading or some other suitable mechanism. When the canister 22 is coupled with the support column 24, the threads of the support column 24 protrude through the canister top opening 66. The interior threads of the cap 6 are configured for screwing onto the support column 24 threads. A cap gasket 52 is positioned between the cap 6 and the canister 22. A portion of the canister 22 near the canister top opening 66 rests on a column support flange 28. The column support flange 28 is a perpendicular flange that is permanently affixed or molded to the support column 24. The cap 6 is typically made of plastic or metal and has torque handles 60 that allow the cap 6 to be torqued onto the support column 24 threads to compress the canister 22 onto the baseplate 2. The canister 22 compresses a baseplate gasket 32 between the canister flange 34 and the baseplate 2. Both the baseplate gasket 32 and cap gasket 52 are typically made from rubber, EPDM, or neoprene, but may be made of other suitable materials. When compression is sufficient between the canister flange 34 and baseplate gasket 32, it creates a watertight connection.

The second function of the support column 24 is to act as an inner partition for the filter media 42. The support column 24 has a plurality of penetrations to allow the liquid to pass from the exterior of the support column 24 to the interior. The support column 24 has an inner partition screen 38 is a plastic or metal mesh screen and that is affixed around the circumference of the support column 24 such that it allows the liquid to pass through on all sides and for substantially all of its vertical height. The inner partition screen 38 is affixed to the support column 24 via a mechanical connection.

The center riser pipe 8 is a vertical pipe positioned inside the support column 24. The center riser pipe 8 has a bottom end that is permanently affixed to the baseplate 2 at a center point of the column spigot 4 via a glued or threaded watertight connection. The center riser pipe 8 has a top end that is unconnected and open. The top end of the center riser pipe 8 terminates above the level of the canister ceiling 68 and above the level of the top of the horizontal weir 9. On the bottom of the center riser pipe 8 there is a leach orifice 48. The leach orifice 48 is a small hole configured for allowing any remaining water inside the exemplary filtration device 70 to drain once the siphons have ceased.

Near the outer edge of the baseplate 2 there is an outer partition flange 36. The outer partition flange 36 is a circumferential flange configured for attachment of the media basket 40. The media basket 40 is typically attached to the outer partition flange 36 via a bolted or riveted mechanical connection. The filter media 42 can be one or more of a multitude of different materials. The specific composition of the filter media 42 can be tailored specifically to remove desired contaminants, based upon the installation location and/or expected contaminants. The filter media 42 may be tailored for capturing physical, dissolved, and/or ionic contaminants. Potential example filter materials are perlite, carbon, sand, activated alumina, and peat.

The canister 22 is typically made from plastic or fiberglass reinforced polymer, but may be made of other suitable materials. The canister 22 has one or more canister pipes 39, each comprising an exterior canister pipe 41 and an interior canister pipe 45. During operation the exterior canister pipe 41 and interior canister pipe 45 act as a uniform conveyance pipe allowing siphon operation. The exterior canister pipes 41 run vertically along the exterior of the canister 22. The exterior canister pipes 41 are configured to convey the contaminated liquid from the containment structure 1 into the exemplary filtration device 70. The exterior canister pipes 41 are typically semi-circular or rectangular in cross-section, but may be some other suitable shape. The exterior canister pipes 41 each have a sealed top and an exterior bottom orifice 62 that is open to the environment. The exterior canister pipe 41 is typically made of plastic or some other suitable material. The exterior canister pipe 41 is either molded into the canister 22 or affixed permanently to the side. The interior canister pipe 45 is typically a mirror image to the exterior canister pipe 41, though in some embodiments there may be some variation in shape. The interior canister pipe 45 is typically made of plastic or some other suitable material. The interior canister pipe 45 is permanently affixed to the interior wall of the canister 22 and has a closed top and an interior bottom orifice 64. The canister 22 has a horizontal weir 9 separating the exterior canister pipe 41 from the interior canister pipe 45, except for a canister pipe chamber 44 above the top of the horizontal weir 9 that allows the liquid to pass from the exterior canister pipe 41 to the interior canister pipe 45.

A nappe deflector 49 may be affixed to the interior canister pipe 45 side of the horizontal weir 9 near the top such that it will increase the horizontal trajectory of the liquid as it passes from the exterior canister pipe 41 over the horizontal weir 9 to the interior canister pipe 45. During operation the exterior canister pipe 41 and interior canister pipe 45 act as a uniform conveyance pipe allowing siphon operation. In some embodiments, an exterior screen 47 may be affixed to the outside of the canister 22 such that it encompasses the exterior bottom orifice 62. This minimizes the potential for occlusion of the exterior canister pipe 41 orifice.

Exemplary Embodiment—Operation Description

Fluid is conveyed through the exemplary filtration device 70 via two unique siphons; an exterior siphon and an interior siphon. The exterior siphon conveys contaminated liquid into the exemplary filtration device 70 while the interior siphon conveys treated liquid out of the exemplary filtration device 70. In the exemplary embodiment, the filtration device 70 is affixed inside a containment structure 1 where liquid is conveyed into the structure until it reaches an elevation in which the hydraulic head is sufficient enough to operate the interior and exterior siphons thus conveying the liquid through the filter media 42 and into an outlet manifold 30 to downstream discharge.

The exemplary filtration device 70 can be used in a stand-alone or modular configuration. In the exemplary embodiment, the exemplary filtration device 70 is affixed to the containment structure 1. Contaminated liquid is conveyed into the containment structure 1 via pipes, surface grates, downspouts, and/or open channels 29. The containment structure 1 is typically an impermeable vault, manhole, and/or catch basin and is most likely made of concrete, steel, plastic, or potentially fiberglass. The containment structure 1 may allow any suspended liquid contaminants to settle out prior to entering the exemplary filtration device 70. As liquid accumulates in the containment structure 1, the liquid elevation increases such that the liquid enters the exemplary filtration device 70 via the exterior bottom orifices 62 on the bottom of the exterior canister pipes 41. The exemplary filtration device 70 may employ multiple exterior canister pipes 41 to increase the total incoming flow rate. As the liquid inside each exterior canister pipe 41, it eventually reaches the canister pipe chamber 44 that contains a horizontal weir 9. As the liquid level continues to increase, liquid fills the canister pipe chamber 44 and begins to spill over the horizontal weir 9 into the interior canister pipe 45 associated with that exterior canister pipe 41. As the liquid continues to spill over the horizontal weir 9 and down the interior canister pipe 45, it has sufficient velocity to create negative pressure in the canister pipe chamber 44. The negative pressure allows trapped air within the canister pipe chamber 44 to be conveyed, with the liquid, through the interior canister pipe 45 and into the canister cavity 26. This process continues until all the air in the canister pipe chamber 44 is removed thus creating liquid communication between the exterior canister pipe 41 and interior canister pipe 45. The resulting liquid communication shall herein be referred to as the exterior siphon and the process of removing the air from the canister pipe chamber 44, the interior canister pipe 45 and the exterior canister pipe 41 is referred to as "priming" the exterior siphon. Siphoned liquid exits the interior canister pipe 45 via the interior bottom orifice 64 and begins to fill the canister cavity 26.

Figure 11:
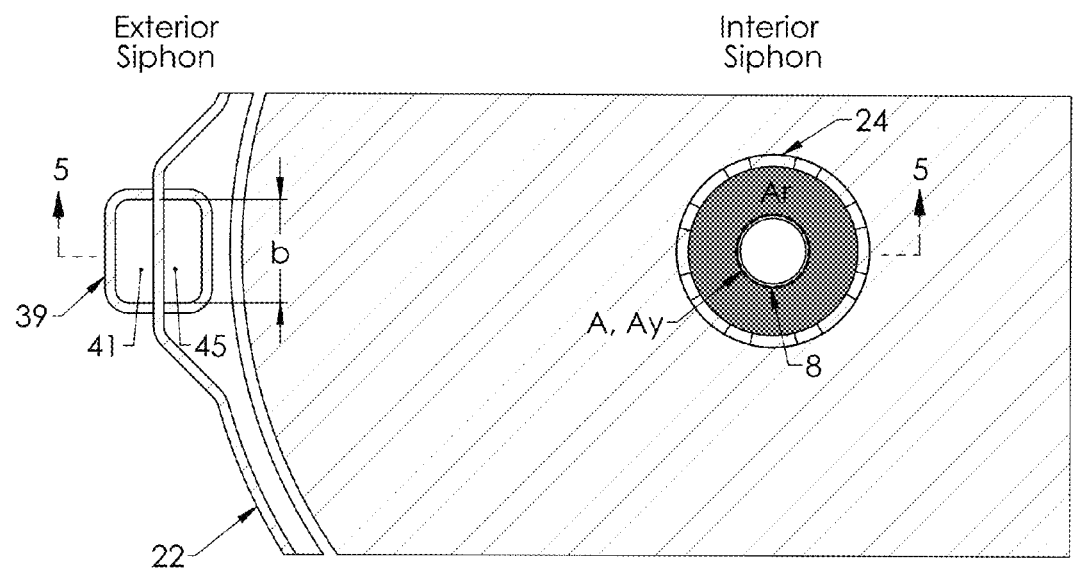
FIG. 11 shows a top view of the device showing design variables as it relates to the interior and exterior siphons.
Figure 12:
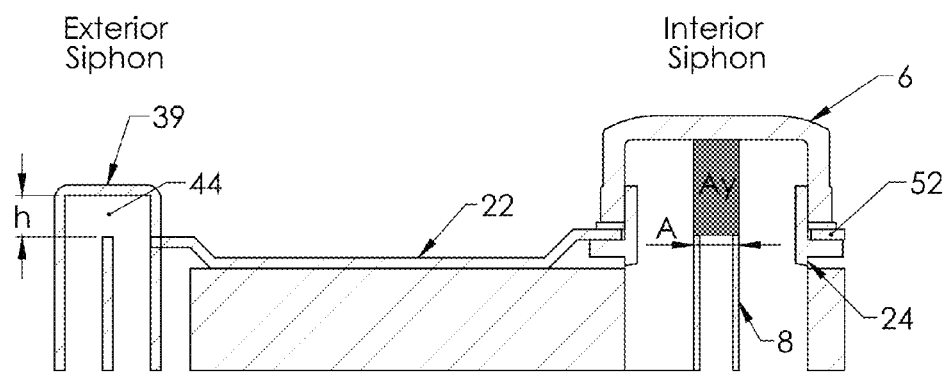
FIG. 12 shows a cross-sectional view taken along Line 5-5 of FIG. 11 showing design variables as it relates to the interior and exterior siphons.

For priming of the exterior siphon to occur and to achieve stable siphon flow the canister pipe chamber 44 must be constructed in accordance within the parameters of a design ratio. As shown in FIG. 11 and FIG. 12, the canister pipe chamber 44 has a width b and a height h. Optimally, the canister pipe chamber 44 has a width to height ratio b/h in the range of 1 to 4. However, a width to height ratio b/h in the range of 0.25-8.0 will be functional.

A nappe deflector 49 may be affixed to the wall of the interior canister pipe 45 facing radially inward towards the center of the exemplary filtration device 70 such that it will increase the horizontal trajectory of the liquid. The additional horizontal trajectory reduces the siphon priming time by decreasing the available area for air to re-enter the canister pipe chamber 44 as the siphon is established.

The canister cavity 26 encompasses the sealed space between the canister 22 and the baseplate 2. Within the canister cavity 26 the filter media 42 is contained between the media basket 40 and the inner partition screen 38. The media basket 40 and inner partition screen 38 are circumferential vertical screens that allow the passing of liquid but not the filter media 42. Contaminated liquid passes through the filter media 42 horizontally until it reaches the permeable support column 24 which contains the center riser pipe 8. Siphoned liquid will continue to fill the canister cavity 26 until it reaches the canister ceiling 68. The air from the canister cavity 26 is displaced by the liquid and exits via the center riser pipe 8 and outlet pipe 7. Once liquid fills the canister cavity 26, the liquid enters into the interior void space of the cap 6. The inlet of the center riser pipe 8 is located medially within the small void space on the interior of the cap 6 and above the canister ceiling 68. Fluid enters the center riser pipe 8 via the inlet, which is a horizontal orifice on the top of the center riser pipe 8 that acts as a weir to transmit liquid from inside the cap 6. The inlet weir may be flared or serrated to increase the weir length and thus increase the spill flow rate. As liquid begins to spill over the weir of the center riser pipe 8, it is transmitted vertically downward. When the downward flow has sufficient velocity it creates negative pressure inside the void space of the cap 6 thus transmitting air down the center riser pipe 8 and into the outlet pipe 7. When all of the air is removed from the void space of the cap 6 a siphon is formed and liquid communication is established between the canister cavity 26, cap 6, and the center riser pipe 8. This liquid communication shall herein be referred to as the inner siphon. When liquid reaches the bottom of the center riser pipe 8 it is conveyed into an affixed outlet pipe 7. Fluid is conveyed through the outlet pipe 7 and into an optional outlet manifold 30. The outlet manifold 30 is a series of outlet pipes that connect in parallel to allow multiple exemplary filtration devices 70 to be connected in parallel. Fluid exits the outlet pipe 7 (and optional outlet manifold 30) and is conveyed out of the containment structure via a downstream pipe 31.

For priming of the interior siphon to occur and to achieve stable siphon flow, the central riser pipe 8 and the area under the cap 6 must be constructed in accordance within the parameters of a design ratio. As shown in FIG. 11 and FIG. 12, the outlet of the center riser pipe 8 has an outlet area A. A passage area $A_y$ is defined as a vertical cross-sectional area above the center riser pipe outlet and below the cap. An entrance ring area $A_r$ is defined as a horizontal cross-sectional area between the cap 6 and the top of the center riser pipe 8. To ensure priming of the interior siphon, a ratio $A_y/A$ has a value in a range from 1.0 to 22.5 and a ratio $A_r/A$ has a value in a range from 1.0 to 22.0.

The exemplary filtration device 70 utilizes two distinct siphons that establish liquid communication between the containment structure 1, canister cavity 26, center riser pipe 8, and the outlet pipe 7. As liquid ceases to enter the containment structure 1, the siphons in the apparatus continue to operate thus drawing down the liquid level in the containment structure 1. Once the liquid in the containment structure 1 reaches the exterior bottom orifice 62 of the exterior canister pipe 41, it allows the introduction of air into the canister pipe chamber 44. The air accumulates in the canister pipe chamber 44 and will eventually break the liquid connection between the exterior canister pipe 41 and the interior canister pipe 45, thus ceasing the outer siphon. Once the outer siphon is broken the inner siphon will cease as it no longer has liquid communication with the containment structure 1. At this instance the liquid in the canister 22 has a higher elevation than the liquid in the containment structure 1 and an unbalanced hydraulic force exists. Fluid will than reverse direction and flow from the canister cavity 26 through the exterior canister pipes 41 and interior canister pipes 45 and back into the containment structure 1. Fluid inside the canister cavity 26 is replaced by air from the now empty outlet pipe 7. A reverse outer siphon will develop and liquid will flow out of the canister cavity 26 until it reaches the interior bottom orifice 64 of the interior canister pipe 45. This back-flushes the exemplary filtration device 70, removing contaminant particles from the filter media 42 out into the containment structure 1. This extends the life of the filter media 42. Air from the canister cavity 26 will be introduced into the interior canister pipe 45 and fill the canister pipe chamber 44 causing the reverse outer siphon to cease. Any remaining water inside the exemplary filtration device 70 will slowly drain down via the leach orifice 48. The operation cycle of the exemplary filtration device 70 is now complete and the canister cavity 26 will be empty of liquid and ready for the next operation cycle.

What is claimed is:

1. A filtration device comprising:
a baseplate;
a media basket coupled to the baseplate;
a support column coupled to the baseplate and positioned within the media basket;
wherein the media basket and the support column are permeable to liquids and configured to contain a filter media;
a canister with one or more sides and a ceiling defining a cavity, wherein the canister is detachably coupled to the baseplate thereby enclosing the media basket in the canister cavity;
a cap positioned on top of the canister ceiling with a void space under the cap;
a center riser pipe coupled to the baseplate and positioned within the support column, with an inlet at the top of the center riser pipe, wherein the center riser pipe inlet is above the canister ceiling;
at least one canister pipe fixed in one of the sides of the canister, the canister pipe comprising an exterior canister pipe and an interior canister pipe separated by a weir, wherein the exterior canister pipe and the interior canister pipe open into a chamber in a top portion of the canister pipe above the weir;
an exterior bottom orifice in a bottom portion of the exterior canister pipe communicating with an environment external to the filtration device; and
an interior bottom orifice in a bottom portion of the interior canister pipe communicating with the canister cavity.

2. The filtration device of claim 1,
wherein the top of the center riser pipe is positioned within the void space under the cap.

3. The filtration device of claim 2,
further comprising a center riser pipe outlet with an outlet area A;
wherein a passage area $A_y$ is defined as a vertical cross-sectional area above the center riser pipe outlet and below the cap;
wherein an entrance ring area $A_r$ is defined as a horizontal cross-sectional area between the cap and the top of the center riser pipe;
wherein a ratio $A_y/A$ has a value in a range from 1.0 to 22.5; and
wherein a ratio $A_r/A$ has a value in a range from 1.0 to 22.0.

4. The filtration device of claim 2,
wherein the canister pipe chamber has a height h and a width b; and
wherein a ratio b/h has a value in a range from 0.25 to 8.

5. The filtration device of claim 2, further comprising:
a canister gap between the canister and the media basket.

6. The filtration device of claim 2, further comprising:
a column gap between the center riser pipe and the support column.

7. The filtration device of claim 2, further comprising:
a column support flange in a top portion of the support column and a cap gasket on a top surface of the column support flange;
a baseplate gasket between the baseplate and the canister;
wherein the support column penetrates a canister top opening in the canister ceiling; and
wherein the cap is configured to detachably couple to the support column and to compress the canister against the cap gasket and the baseplate gasket.

8. The filtration device of claim 1,
wherein the top of the center riser pipe is flared.

9. The filtration device of claim 1, further comprising:
a leach orifice in a bottom portion of the center riser pipe.

10. The filtration device of claim 1,
wherein the canister ceiling contacts a top of the media basket.

11. The filtration device of claim 1,
a nappe deflector on the top portion of the weir and inside the interior canister pipe.

12. The filtration device of claim 1,
wherein the filtration device is configured to establish a first siphon to convey liquid from the exterior bottom orifice through the interior bottom orifice into the canister cavity when a liquid level outside the filtration device is higher than the top of the weir; and
wherein the filtration device is configured to establish a second siphon to convey liquid from canister cavity through the top of the center riser pipe and out an outlet pipe when the first siphon has been established and the liquid level outside the filtration device is higher than the top of the center riser pipe.

13. The filtration device of claim 12,
wherein the filtration device is configured to break the first siphon when the liquid level outside the filtration device is lower than the exterior bottom orifice, then break the second siphon when a liquid level inside the support column is lower than the top of the center riser pipe.

14. The filtration device of claim 13,
wherein the filtration device is configured such that once the second siphon breaks, then the filtration device will establish a reverse siphon, drawing the liquid inside the canister cavity in through the interior bottom orifice, through the interior canister pipe through the exterior canister pipe and out through the exterior bottom orifice, back-flushing particulate matter from the canister cavity.

* * * * *